United States Patent [19]
Brown

[11] Patent Number: 5,308,502
[45] Date of Patent: May 3, 1994

[54] METHOD FOR WASTE TREATMENT OF ORGANIC STRIPPERS CONTAINING METALS

[75] Inventor: James A. Brown, Layton, Utah

[73] Assignee: Tandy Coporation, Fort Worth, Tex.

[21] Appl. No.: 992,119

[22] Filed: Dec. 17, 1992

[51] Int. Cl.$^5$ .............................. C02F 1/52; C02F 1/62
[52] U.S. Cl. ..................... 210/724; 210/912; 210/908
[58] Field of Search ............. 210/702, 912, 908, 909, 210/716, 724

[56] References Cited

U.S. PATENT DOCUMENTS

| | | | |
|---|---|---|---|
| 3,586,498 | 6/1971 | Kasey | 75/101 |
| 3,986,975 | 10/1976 | Bayer et al. | 252/175 |
| 4,035,259 | 7/1977 | Casale | 252/175 |
| 4,294,705 | 10/1981 | Hellestam | 210/695 |
| 4,343,706 | 8/1982 | Etzel et al. | 210/667 |
| 4,362,643 | 12/1982 | Kuo et al. | 252/175 |
| 4,402,851 | 9/1983 | Lindahl | 252/175 |
| 4,409,119 | 10/1983 | Burger et al. | 252/156 |
| 4,539,119 | 9/1985 | Cann | 210/711 |
| 4,566,986 | 1/1986 | Waldmann | 252/175 |
| 4,713,144 | 12/1987 | Schiller | 156/656 |
| 4,760,014 | 7/1988 | Wong | 430/399 |
| 4.857,206 | 8/1989 | Choo | 210/709 |
| 4,923,629 | 5/1990 | Hasegawa et al. | 252/181 |
| 4,999,114 | 3/1991 | Choo | 210/709 |
| 5,102,777 | 4/1992 | Lin et al. | 430/331 |
| 5,182,029 | 1/1993 | Erb | 210/724 |

FOREIGN PATENT DOCUMENTS 1148389A 9/1989 Japan .

*Primary Examiner*—Neil M. McCarthy
*Attorney, Agent, or Firm*—Madson & Metcalf

[57] ABSTRACT

A method for treating liquid wastes containing photoresist polymers and heavy metals is disclosed. The method includes adding to the liquid wastes an aqueous solution of water soluble $Fe^{+3}$ and $Al^{+3}$ salts at a pH in the range of from about 0.1 to 1.0, and a water soluble salt of $Mg^{+2}$ or $Ca^{+2}$. The ratio of the amount of the $Fe^{+3}$ and $Al^{+3}$ to the amount of the $Mg^{+2}$ or $Ca^{+2}$ is in the range of from 2 to 3 moles to 1 to 3 moles. A precipitate containing the heavy metals and photoresist polymers is formed.

4 Claims, No Drawings

METHOD FOR WASTE TREATMENT OF ORGANIC STRIPPERS CONTAINING METALS

BACKGROUND

1. The Field of the Invention

The present invention is related to compositions and methods for treatment of waste organic strippers which may also contain metals, such as copper. More particularly, the present invention is related to new compositions which are capable of removing waste organics and metals from stripper solutions in the form of easily processible precipitates.

2. Technical Background

The treatment of liquid and solid industrial and domestic waste has long presented numerous problems. With the development of more complex industries in densely populated areas, liquid waste has become an ever greater concern. In the past, liquid waste found its way freely into rivers, lakes, and other bodies of water. Treatment of such waste was minimal. Initially liquid waste did not present a significantly recognized problem, especially in areas such as lightly populated rural areas. As industry developed and became more complex, however, greater volumes of hazardous liquids required disposal. At the same time, awareness of the importance of scarce water and land resources increased as populations became more dense. For example, it was discovered that waste deposited years earlier was polluting ground water and causing numerous other problems.

In response to the health and environmental hazards produced by increases in potentially toxic waste, legislation was developed to govern the disposal of such waste. Various types of waste are regulated under federal and state environmental schemes, including disposal of waste water and disposal of both liquid and solid "toxic" or "hazardous" chemicals, as those terms are defined by statute and regulation.

As concern about disposal of liquid waste increased, technology began to address the problems involved. Various types of chemical and physical processes were developed to treat waste water. The most basic solution to liquid waste has been to simply allow suspended waste to settle out of the liquid. This is accomplished by placing the waste liquid in some type of settling pond and allowing the solids sufficient time to settle out. The clarified liquid is then separated from the solid layer.

In many contexts, it has been found desirable to accelerate the settling process. Thus, flocculating agents have been developed for addition to the polluted liquid. This "floc" combines with the suspended waste solids in a waste solution and accelerates the gravity settling of the solids. Common flocculating agents include alum (aluminum sulfate) and iron sulfate. These materials hydrolyze under weak acid to neutral conditions to form a sticky, gelatinous floc. This material accelerates the sedimentation of the solids suspended in the liquid.

More sophisticated treatments have also been developed for specific uses. Various chemical schemes and combinations of chemicals have been developed to suit particular needs. For example, polysilicic acid has been found to work as a flocculating agent in the presence of a water-soluble metal salt. It has also been discovered that certain combinations of magnesium and calcium ions aid in the treatment of degreasing and cleaning solutions. In one process, heavy metals are removed from industrial waste streams by use of ferric ions and an alkaline material at a basic pH. Other treatment methods employ magnetic processes to separate sludge materials. These and many other processes and materials have been used in attempts to treat various types of liquid wastes.

Unique problems are presented when it is necessary to treat waste liquids which include complex organic materials as well as heavy metals. One example is in the production of printed circuit boards where waste liquids are produced which include significant quantities of both organic materials and metals.

In typical processes, printed circuit boards are produced using a copper-clad substrate element of high dielectric strength which is coated with a photopolymer, called a "photoresist." The copper-clad substrate may begin the process of printed circuit board production by exposing the photoresist to electromagnetic radiation through a masking stencil. The radiation polymerizes the exposed areas, rendering those areas less soluble than the unexposed areas. The circuit board is then exposed to a developing agent. Upon contacting the developing agent, a reaction occurs with the non-exposed portions of the photopolymer, removing the photoresist from the copper surface. The exposed areas, conversely, are not removed from the surface. This produces a particular desired pattern.

In an alternative process, printed circuit boards may be made using a screening ink or liquid resist. In this process a photoreactive emulsion is screened onto the copper substrate to form an image of the desired pattern. The pattern is then screened onto the substrate by forming the image on a screen which forms as stencil. Ink is then applied to the stencil and a thin layer of the resist film is spread across the entire pattern. As a result, the image of the circuit pattern is transformed onto the copper coating on the substrate. The screen coating is cured and then etched. Following the etching steps, the ink is removed with an alkaline stripper solution.

It will be appreciated that liquid waste compositions remain following the production of printed circuit boards by either process. Both processes produce waste solutions which are complex and difficult to process. For example, the waste solution may include the organic stripper, the organic materials used in the process of preparing the printed circuit boards (such as inks, developing solution, and photoresists), as well as significant quantities of heavy metals originating from the board (principally copper and lead). The organic stripper is typically an organic solvent, such as butyl cellosolve (ethylene glycol monobutyl ether), together with various other optional components such as amines, surfactants, ketones, and the like. Thus, it will be appreciated that a very complex and potentially toxic waste is produced.

It has been found that it is not possible to treat this material with simple conventional treatment techniques. For example, processes such as ion exchange or continuous flow processes are not satisfactory. At the same time, governmental interest in regulation of disposal of this type of material is increasing. Thus, it is not generally possible to expose the material to conventional treatment techniques and then discharge the waste into municipal waster water systems or landfills. As is well appreciated, the production of waste that must be disposed of using particular regulated techniques greatly increases the cost of the process, resulting in higher prices for the product, and reduced profits for the manufacturer.

Agencies charged with environmental regulation have developed specific standards for disposal of solid and liquid wastes of this type. One common test is referred to as the Toxic Characteristic Leaching Procedure (TCLP). This test determines whether a waste solid is explosive, ignitable, corrosive, or if it is prone to leach harmful materials after disposal. Specifically, TCLP accesses the tendency of the waste material to leach over set time periods. If a material meets TCLP it is eligible for disposal in conventional landfills in that it is not likely to leach into ground or surface water. If a material fails to meet TCLP, it must be disposed of using expensive procedures required for toxic and hazardous materials.

In the present context, if the liquid waste is subjected to a flocculating agent, it would be very desirable for the resulting solid waste to avoid significant leaching once it is disposed of. This has been difficult to achieve with known techniques and materials. In addition, precipitates produced by known techniques are difficult to handle because of their physical and chemical characteristics. Such materials are typically sticky or gummy in consistency and, therefore, difficult to handle. These characteristics of the precipitates make them undesirable and increase the difficulty of disposal.

Similarly, there are also stringent standards for the disposal of liquid wastes. If the liquid waste contains significant toxic or hazardous materials, special processing is required. Such materials include specified organics and metals. The organics and metals contained within spent stripper solutions generally fall within the regulated classes. Conversely, if the liquid waste does not contain such materials, it can often be directly disposed of without processing, or by simply diluting the waste prior to disposal.

Thus, in the context of industrial processes in which complex liquid wastes are formed, it would be a significant advantage to render them disposable with conventional techniques. If it is necessary to resort to disposal methods specified for toxic and hazardous materials, the overall cost of the industrial process escalates significantly.

Accordingly, it would be a significant advancement in the art to provide methods and compositions for treating complex industrial wastes which contain both organic materials and heavy metals. More particularly, it would be a significant advancement in the art to provide such methods and compositions which rendered such wastes disposable by simple conventional techniques. It would be a further advancement in the art to provide methods and compositions which when added to such complex waste liquids would produce an easily handled solid material. It would be a related advancement in the art if the solid material was not prone to leaching once disposal occurred.

Such methods and compositions are disclosed and claimed herein.

BRIEF SUMMARY AND OBJECTS OF THE INVENTION

The present invention relates to methods and compositions for treating complex liquid wastes. The compositions are particularly adaptable for treating spent organic strippers used in the process of making printed circuit boards. However, the methods and compositions are also useful in other applications which call for the treatment of a liquid waste which contains both organic and metal contaminants.

In that regard, the present invention provides compositions which when added to complex liquid wastes containing metals and organics produces a precipitate. The precipitate is as dewaterable solid which is fluffy in consistency, not sticky or gummy, and can be easily handled. In addition, the precipitate is not prone to leaching of contained metals. Accordingly, in many instances it may be possible to meet environmental disposal regulations with relative ease. Once the precipitate is formed it is also possible to recycle the liquid for further use in the process, such as printed circuit board manufacture. Alternatively, the liquid my qualify for disposal by simple conventional means. The composition of the present invention comprises three major components. The first component is a quantity of ferric ions ($Fe^{+3}$) Ferric ions may, for example, be provided by adding ferric sulfate ($Fe_2(SO_4)_3$) to the composition. Alternatively, compounds such as ferric chloride or ferric nitrate may be added to the composition. Ferric ions are preferred because they catalyze reduction and complexation of metals in the solution and promote aggregation of the precipitate. The mechanism for metal reduction catalyzed by the ferric ion is believed to be essentially as follows:

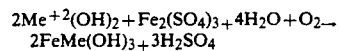

$$2Me^{+2}(OH)_2 + Fe_2(SO_4)_3 + 4H_2O + O_2 \rightarrow 2FeMe(OH)_3 + 3H_2SO_4$$

Thus, the presently preferred embodiments of the invention include a source of ferric ions.

The next important component is a strong acid. Sulfuric acid is presently preferred. Other acids, such as HCl, may also function well if the other ingredients of the composition are also adjusted accordingly. Sulfuric acid is used in order to provide the necessary pH control and to aid in the reduction of the metals in solution. The sulfuric acid also serves as an $SO_4^-$ donor in the overall reaction scheme.

Another important component is a source of aluminum ions. The presently preferred source of aluminum ions in solution is $Al_2(SO_4)_3$ added to the composition in liquid form. The use of aluminum in the solution results in an easily handled flocculated precipitate, as well as increasing clarity in the resulting solution. Without aluminum the precipitate may be sticky, gummy, and difficult to handle. By contrast, when aluminum is present in the composition, a fluffy precipitate is produced.

A further optional component is a source of calcium, or more preferably magnesium, ion in solution. Magnesium or calcium ions ($Me^{+2}$) aid in governing the metal complexing process in the mixture and may also help lower the concentration of the organics in the resulting solution. The mechanism by which this is accomplished is believed to be essentially as follows:

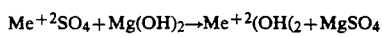

$$Me^{+2}SO_4 + Mg(OH)_2 \rightarrow Me^{+2}(OH)_2 + MgSO_4$$

The preferred method of formulating the composition of the present invention is to start with a ferric solution, such as $Fe_2(SO_4)_3$, comprising about 50% as ferric sulfate. Sulfuric acid is then added. The addition of sulfuric acid results in heat production. The temperature rises from ambient to the range of from about 85° C. to about 100° C. Next $Al_2(SO_4)_3$ is added such that it constitutes from about 1% to about 2% of the composition, and preferably not more than 5%. If aluminum ion comprises more than about 5% of the total composition it is prone to cross link with the ferric ion and defeats the effectiveness of the composition.

Finally, $MgSO_4$ may be added in dry form under slight heat. Once all of the components are combined the resulting composition is allowed to cool to room temperature.

Thus, the overall composition can be defined generally as a solution comprising, in relative percentages, from about 2 moles to about 3 moles $Me^{III}$, wherein $Me^{III}$ is selected from the group consisting of $Fe^{+3}$ and $Al^{+3}$, and wherein at least a portion of said $Me^{III}$ comprises $Al^{+3}$; from about 1 mole to about 3 moles $Me^{II}$, wherein $Me^{II}$ is selected from the group consisting of $Mg^{+2}$ and $Ca^{+2}$; and from about 4 moles to about 5 moles monovalent or divalent anions. In this composition the anions are generally selected from the group consisting of Cl, $NO_3^-$, and $SO_4^{2-}$, with $SO_4^{2-}$ being preferred for most known applications. As mentioned above, the compositions preferably comprise an acid such as $H_2SO_4$ and HCl. As a result, the compositions will have a pH in the range of about 0.1 to about 1.0.

When the composition is added to complex waste liquids, such as liquid waste produced during the production of printed circuit boards, it is found that a fluffy precipitate is produced. The precipitate includes organic contaminants, as well as heavy metals. The precipitate is resistant to leaching and is easily disposed. The former waste liquid may also be capable of reuse or simple disposal, in that the toxic materials have been removed. The present invention also operates without the necessity of forming complex double salts or organic polymers within the composition. Thus, the formulation is simple to produce and use.

Accordingly, it is a primary object of the present invention to provide methods and compositions for treating complex industrial wastes which contain both organic materials and heavy metals.

It is a related object of the present invention to provide such methods and compositions which render complex wastes disposable by conventional techniques.

It is another object of the present invention to provide compositions which when added to such complex waste liquids produce an easily handled solid material.

It is a further object of the present invention to provide waste treatment methods and compositions which are capable of producing waste materials which are capable of producing a precipitate which is not prone to leaching.

These and other objects and advantages of the invention will become apparent upon reading the following detailed description and appended claims.

DETAILED DESCRIPTION OF THE PREFERRED EMBODIMENTS

The present invention relates to compositions for use in treating complex wastes containing organic compounds, organic polymers, and heavy metals. In certain preferred embodiments, the composition comprises a solution of ferric and aluminum ions in a strong acid. In one embodiment, for example, ferric and aluminum ions are added to solution in the form of sulfates of those ions, and the strong acid is sulfuric acid. The composition may optionally also include magnesium or calcium ions, added in a form such as magnesium sulfate.

Another way of expressing the formulation is as a solution comprising, in relative percentages, from about 2 moles to about 3 moles $Me^{III}$, from about 1 mole to about 3 moles $Me^{II}$, and from about 4 moles to about 5 moles monovalent or divalent anionic groups. In such a composition $Me^{III}$ is selected from the group consisting of $Fe^{+3}$ and $Al^{+3}$; whereas $Me^{II}$ is selected from the group consisting of $Mg^{+2}$ and $Ca^{+2}$. The anionic groups are generally selected from the group consisting of Cl, $NO_3^-$, and $SO_4^{2-}$.

In one preferred embodiment of the present invention, the order of addition of the various components to form the composition is of interest. The composition may, for example, comprise the following materials added in the following order and in the following approximate proportions:

| Order of Addition | Material | Liquid Proportion |
|---|---|---|
| 1 | $Fe(SO_4)_3$ (50% solution) | 10–50% |
| 2 | $H_2SO_4$ (92% solution) | 10–30% |
| 3 | $Al_2(SO_4)_3$ (50% solution) | 0.5–5% |
| 4 | $MgSO_4$ (solid) | 0.1–5.0% |
| 5 | Water | balance |

More preferably, the composition will comprise the following materials added in the following order and in the following approximate proportions:

| Order of Addition | Material | Liquid Proportion |
|---|---|---|
| 1 | $Fe(SO_4)_3$ (50% solution) | 15–20% |
| 2 | $H_2SO_4$ (92% solution) | 18–20% |
| 3 | $Al_2(SO_4)_3$ (50% solution) | 1–2% |
| 4 | $MgSO_4$ (solid) | 0.2–1.0% |
| 5 | Water | balance |

In some embodiments, it is also preferred to add from about 0.5% to about 1.0% $Na_2(SO_4)$ in solid form. $Na_2(SO_4)$ is observed to catalyze reduction of certain metals of interest, such as chromium. It also solubilizes the sulfates in solution and reduces temperature sensitivity in the desired reactions.

Each of the mentioned ingredients is readily available from commercial chemical suppliers. Thus, the present invention is relatively simple to formulate and economical to use.

During mixing the composition produces heat which preferably elevates the temperature of the mixture from ambient to from about 85° C. to about 100° C. upon the addition of $H_2S_4$. The composition is also heated upon the addition of $MgSO_4$. Following this addition, the composition is preferably cooled to room temperature over a period of a few hours.

In one exemplary embodiment of the present invention, the following materials are added in the following relative percentages:

| Material | Percent | |
|---|---|---|
| $MgSO_4$ | 10.75 | (W:V) |
| $Fe_2(SO_4)_3$ | 21.50 | (W:V) |
| $Al_2(SO_4)_3$ | 0.106 | (W:V) |
| $H_2SO_4$ | 16.00 | (V:V) |
| Water | balance | |

As mentioned above, the sulfate forms of the above materials are presently preferred. However, the chloride and nitrate forms also fall within the scope of the invention. The nitrate is presently somewhat less preferred because it may increase the biological oxygen demand (BOD), and thus may not be preferable in some settings, particularly where disposal of the liquid into municipal sewer systems is desired.

The compositions of the present invention, once formed, are available for use in the treatment of liquid wastes containing organics and heavy metals. As mentioned above, once the material is added to the waste solution, it is observed that a fluffy precipitate is formed. It is found that the precipitate includes the heavy metals from the waste solution, as well as significant waste organic materials.

It is presently believed that the precipitate is formed by a three step process. The first step is complexation of the metal and resulting complex formation. A combination of ingredients are selected for addition to the composition such that they are soluble in the waste liquid. These soluble species (ferric, aluminum, magnesium ions, and the like) complex the heavy metals in the solution at the low pH established by the strong acid component of the composition. This occurs by the mechanism explained above.

In the second step of the process, the polymers and related organics in solution are aggregated. Some typical organic species would include butyl cellosolve, ethylene glycol monobutyl ether, 2-butoxy ethanol, mono- and diethanol amines, miscellaneous glycols, glycol ethers, and alcohols. All of these materials are common in spent strippers, and similar liquids, produced during the production of printed circuit boards.

Along with the removal of heavy metals from the waste solution, organic materials, such as photopolymers, are also removed. The photopolymers and organics are presently believed to precipitate by the following mechanism:

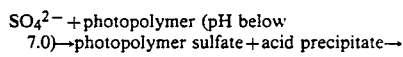

$SO_4^{2-}$ + photopolymer (pH below 7.0) → photopolymer sulfate + acid precipitate →

It is found that the sulfate photopolymer precipitate is not gummy or sticky, but forms a light, fluffy aggregate. This is a distinct improvement over conventional treatment techniques which generally produce a gummy product.

The third step is precipitation of the heavy metals and photopolymer sulfate. During this step, the complexed metals precipitate and are substantially encapsulated within the photopolymer precipitate. This encapsulation aids in the disposal of the waste in that it is less likely to leach. The precipitation mechanism is as set forth above.

It should be noted that while using this procedure to initiate the metal recovery process in complex organometallic applications, a secondary reducing compound may be applied to increase the level of metal recovery. Such compounds may include sodium borohydride ($NaBH_4$) and sodium dimethyldithiocarbamate (DTC).

It will be appreciated, therefore, that the present invention provides methods and compositions for treating complex industrial wastes which contain both organic materials and heavy metals. The resulting product may indeed be capable of disposal by simple conventional techniques. The precipitate produced is also an easily handled solid material and is not prone to leaching.

EXAMPLES

The following examples are given to illustrate various embodiments which have been made or may be made in accordance with the present invention. These examples are given by way of example only, and it is to be understood that the following examples are not comprehensive or exhaustive of the many types of embodiments of the present invention which can be prepared in accordance with the present invention.

EXAMPLE 1

A composition within the scope of the present invention was formulated using chemicals obtained from commercial sources. The composition comprised the following species added in the following relative percentages:

| | | |
|---|---|---|
| $MgSO_4$ | 10.75 | (W:V) |
| $Fe_2(SO_4)_3$ | 21.50 | (W:V) |
| $Al_2(SO_4)_3$ | 0.106 | (W:V) |
| $H_2SO_4$ | 16.00 | (V:V) |
| Water | balance | |

The composition had a pH of 0.85 and a specific gravity of 1.270.

This composition was added to a solution containing spent organic stripper, together with copper ion in solution. A fluffy precipitate was formed and removed. The supernatant liquid was analyzed for content of metallic and organic species. It was observed that of the organics and metals originally present in the spent stripper, approximately 99% of the organics and approximately 66-70% of copper was removed from the supernatant liquid.

It was also observed that, using this formulation, flocculation is aided by the addition of a polymeric species such as an anionic polyelectrolyte polymer such as 9225-55 Emulsion Polymer commercially available from Environmental Chemistries, Inc., Salt Lake City, Utah. Such a polymer is preferably added such that it constitutes from about 0.1% to about 0.5% of the composition.

EXAMPLE 2

The composition of Example 1 was again prepared and added to a waste stream of spent stripper containing both metals and photopolymers. The waste solution consisted of 50% RS 1608 Resist Stripper, commercially available from Dexter Corp., and 50% 654D Resist Stripper, commercially available from Shipley Corporation. Both of these stripping solutions are chiefly alkaline amine formulations.

Representative waste streams of these compositions were obtained from a commercial circuit board production facility. The waste stream tested contained 4-6% waste alkaline resist stripping solution. The predominant waste contained in the spent RS 1608 solution was photopolymer resist laminar in solution. The predominant waste contained in the RS 654D solution was liquid photo imaging (LPI) byproduct.

The waste product contained 32.0 mg/l copper and had a pH of 12.78. The color of the waste solution was blue. When the composition of Example 1 was added to the waste stream a fluffy pale blue precipitate was observed to form.

EXAMPLE 3

In this Example, a 6% solution of spent photopolymer waste of the type described in Example 2 was obtained. The solution consisted of 61% monoethanolamine, 1–15% methyl alcohol, 25–30% aqueous photopolymers, and 1–4% Michler's ketone.

This waste material was mixed slowly with the composition described in Example 1 ("the composition"). The composition was titrated into the waste solution until a pH of 2.5 was reached. During titration (at 175 ml. of the composition to 1 liter of waste solution) it was observed that tiny uniform pin flocculation formed continuously within the waste solution. At pH 7.0 the waste solution underwent a rapid colorimetric change. At this point, large uniform pin flocculation was observed. The solution color changed from deep translucent blue to a pale non-translucent blue.

At pH 7.0 the solution was "thick" and difficult to agitate. At pH 4.0 the solution again changed, both physically and optically. At this point, while remaining pale blue with visible flocculation, the solution again became easy to agitate.

A 5.0 ml sample of the supernate was extracted and filtered utilizing a 20–25 micron filter circle for observation. The aqueous supernate was relatively clear and showed no visual evidence of residual photopolymer presence. At this point 3 drops of 66Be sulfuric acid was applied to the supernate and stirred vigorously. It was observed that tiny flocculation appeared within the supernate.

The composition was then titrated into the waste solution until the solution reached pH 2.5. A 5.0 ml sample was extracted and filtered utilizing a 20–25 micron filter. The filtered aqueous supernate was slightly amber in appearance and showed no visual evidence of residual photopolymer presence. Three drops of concentrated 66Be sulfuric acid was applied to the supernate and stirred vigorously. No visual pin flocculation was observed.

The filtered supernate was then back titrated to pH 12.0 utilizing concentrated RS 1608 Resist Stripper solution. There was no visual evidence of residual photopolymer waste noted in the supernate. The supernate was then analyzed for copper content via atomic absorption spectrophotometry. This analysis indicated that the copper concentration was 30 mg/l. The waste solution was then titrated to pH 8.5 utilizing 0.5 g/l of MgO (dry). As the waste solution climbed above pH 7.0, the color of the solution changed from pale blue to light green. At this point, one milliliter of concentrated anionic polyelectrolyte polymer was added to the solution allowing uniform flocculation to re-form.

Mixing was slowed and then ceased in order to allow the precipitate to settle. After approximately 10 minutes, the precipitate blanket was resting at the base of the test beaker. The precipitate comprised approximately 30% of the total volume of the container. A 5 ml. representative sample was then extracted for copper analysis using atomic absorption spectrophotometry. It was found that the copper concentration had dropped to 12.63 mg/l.

From this Example it can be seen that copper and organics can be removed from a solution of spent stripper. Removal of unwanted materials from spent stripper can also be controlled as desired by variation in pH and by the addition of further flocculating agents, such as anionic polyelectrolyte polymers.

EXAMPLE 4

A composition within the scope of the present invention was formulated using chemicals obtained from commercial sources. The composition comprised the following species added in the following relative percentages:

| | | |
|---|---|---|
| $MgSO_4$ | 10.75 | (W:V) |
| $Fe_2(SO_4)_3$ | 21.50 | (W:V) |
| $Al_2(SO_4)_3$ | 0.106 | (W:V) |
| $H_2SO_4$ | 16.00 | (V:V) |
| $Na_2SO_4$ | 2.00 | (W:V) |
| Water | balance | |

The composition had a pH of 0.92 and a specific gravity of 1.295.

This composition was then added to a solution containing spent organic stripper, together with copper ion in solution. A fluffy pale blue precipitate was formed and removed. The supernatant liquid was then analyzed for content of metallic and organic species. It was observed that of the organics and copper originally present in the waste liquid, approximately 99% of all organics and 66–70% of copper were removed. It was also observed that flocculation occurred at pH 2 without the necessity of adding a polymer to trigger flocculation. It should be noted that the photopolymer is pre-flocculated (large and uniform) and removable at pH 2.0 in the absence of the addition of the polyelectrolyte anionic polymer.

EXAMPLE 5

The composition of Example 1 was formulated in the manner described above. A waste stream of spent stripper was treated with the composition. The waste stream comprised 1100 gallons of stripping solutions including PC4077 and RS6540. The stripper was produced during commercial circuit board production.

Fifty five gallons of the composition were added to the 1100 gallon Waste sample. It was observed that a fluffy precipitate was produced.

Upon addition of the composition it was observed that at pH 8.0, small particles began to form. As the pH dropped to pH 7.0 large pale blue flocculation appeared. At approximately pH 4.0 thin pale blue solution was observed. As the pH was reduced to 2.0 large and easily precipitable flocculation occurred. No additional polymer was required in order to remove the precipitate. The supernatant liquid was analyzed and it was observed that the solution was amber in appearance and no visual particles were observed after 20–25μ filtration.

In this Example it was found that organics in the solution were reduced by 99% and metals were reduced by 67%.

EXAMPLE 6

A composition within the scope of the present invention was formulated in essentially dry form as follows:

| | |
|---|---|
| $MgSO_4$ | 1.25 lb.s |
| $Fe_2(SO_4)_3$ | 100 lb.s |
| $Al_2(SO_4)_3$ | 20 lb.s |

| -continued | |
|---|---|
| H$_2$SO$_4$ | 20 gals. (66Be) |

A waste stream of spent stripper was treated with the composition. The waste stream comprised 1100 gallons of stripping solutions including PC4077 and RS6540. The stripper was produced during commercial circuit board production.

Upon addition of the composition it was observed that at pH 8.0, small particles began to form. As the pH dropped to pH 7.0 large pale blue flocculation appeared. At approximately pH 4.0 thin pale blue solution was observed. As the pH was reduced to 2.0 large and easily precipitable flocculation occurred. No additional polymer was required in order to remove the precipitate. The supernatant liquid was analyzed and it was observed that the solution was amber in appearance and no visual particles were observed after 20–25µ filtration.

In this Example it was found that organics in the solution were reduced by 99% and metals were reduced by 67%.

SUMMARY

In summary the present invention provides compositions and methods for treating complex industrial wastes which contain both organic materials and heavy metals. Significantly, the invention provides methods and compositions which render many complex wastes disposable by conventional techniques. The present invention provides compositions which when added to complex waste liquids of the types described above produce an easily handled solid material which is not prone to leaching.

The composition of the present invention comprises a solution or dry composition which includes, in relative percentages, from about 2 moles to about 3 moles ME$^{III}$, wherein Me$^{III}$ is selected from the group consisting of Fe$^{+3}$ and Al$^{+3}$, and wherein at least a portion of said Me$^{III}$ comprises Al$^{+3}$; from about 1 mole to about 3 moles Me$^{II}$, wherein Me$^{II}$ is selected from the group consisting of Mg$^{+2}$ and Ca$^{+2}$; and from about 4 moles to about 5 moles monovalent or divalent anions.

In one embodiment of the invention the composition comprises from about 10% to about 50% of a 50% Fe$^{+3}$ ion in solution; from about 0.5% to about 5.0 Al$^{+3}$ ion in solution; and from about 10% to about 30% concentrated acid. The composition may be used in a treating method which comprises the steps of reducing the heavy metals in solution; aggregating the organic compounds or polymers by reacting said organic compounds or polymers with an anion; and precipitating the heavy metals and organic compounds or polymers such that said heavy metals are encapsulated within said organic compounds or polymers. In this manner, a non-hazardous waste may be produced.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of treating liquid wastes containing photoresist polymers and heavy metals, comprising the steps of:

treating said liquid wastes with an aqueous solution comprising a water soluble Me$^{+3}$ salt wherein Me$^{+3}$ is selected from the group consisting of Fe$^{+3}$ and Al$^{+3}$, and wherein at least a portion of said Me$^{+3}$ comprises Al$^{+3}$; and a water soluble Me$^{+2}$ salt wherein Me$^{+2}$ is selected from the group consisting of Mg$^{+2}$ and Ca$^{+2}$; and an acid to result in a pH of said aqueous solution in the range of from about 0.1 to about 1.0; wherein the amount of said Me$^{+3}$ to the amount of said Me$^{+2}$ is in the ratio of from about 2 to about 3 moles Me$^{+3}$ to from about 1 to about 3 moles Me$^{+2}$;

wherein a precipitate is formed which contains said heavy metals and said photoresist polymers.

2. The method of claim 1 wherein said water soluble Me$^{+3}$ and Me$^{+2}$ salts comprise anions selected from the group consisting of Cl$^-$, NO$_3^-$, and SO$_4^{2-}$.

3. The method of claim 1 wherein said acid is selected from the group consisting of H$_2$SO$_4$ and HCl.

4. The method of claim 1 wherein said acid and said Me$^{+3}$ are combined at temperatures in the range of from about 85° C. to about 100° C.

* * * * *